United States Patent [19]
Hainski et al.

[11] 3,843,777
[45] Oct. 22, 1974

[54] HEMOLYTIC ASSAY SYSTEM

[75] Inventors: Martha B. Hainski, Glendale; Guido A. Ordonez, Los Angeles, both of Calif.

[73] Assignee: Baxter Laboratories, Inc., Morton Grove, Ill.

[22] Filed: Aug. 10, 1972

[21] Appl. No.: 279,611

Related U.S. Application Data

[63] Continuation of Ser. No. 848,338, Aug. 7, 1969, abandoned.

[52] U.S. Cl............... 424/13, 424/8, 424/11, 424/12
[51] Int. Cl............... G01n 31/00, G01n 33/16
[58] Field of Search.......... 424/11, 12, 13; 23/230 B

[56] References Cited
OTHER PUBLICATIONS

Milgrom, Vox. Sang., Vol. 8, 1963, pp. 537–548.
Milgrom, J. Immunol., Vol. 96, pp. 415–423, (1966).
Martin, Public Health Lab., Vol. 20, 1962, pp. 34–37.
Todd, Clin. Diag. by Lab Methods, W. B. Saunders, 9th Ed. Rev., 1941, pp. 618, 619, 672, 673, 675–687.

*Primary Examiner*—Albert T. Meyers
*Assistant Examiner*—A. Fagelson
*Attorney, Agent, or Firm*—Scott J. Meyer; Louis Altman

[57] ABSTRACT

A rapid and convenient method for the detection and quantitation of complement fixing antibodies in blood serum consisting of admixing predetermined amounts of complement and complement fixing antigen with said serum and then reacting the mixture with a known amount of hemolysin-sensitized erythrocytes in a semi-solid gel medium for a predetermined period of time.

1 Claim, No Drawings

HEMOLYTIC ASSAY SYSTEM

This application is a continuation of application Ser. No. 848338, filed August 7, 1969, now abandoned.

This invention relates to a method for the determination of antibodies in biological fluids and, more particularly, to a diffusion method for the quantitative or semi-quantitative determination of complement fixing antibodies in blood serum.

Antibodies are complex protein substances present in blood serum, some of which are known to protect against infectious agents (bacteria and viruses) or to neutralize toxins. These substances play an important part in the immunization against microbes and toxins. They cause agglomeration or destruction of cells, or precipitation of proteins in what is generally referred to as an antigenantibody reaction.

Various techniques have been developed heretofor for the determination of antibodies or for the measurement of antigen-antibody reactions. Like other proteins, the presence of antibodies can be demonstrated by conventional methods of fractional precipitation, electrophoresis, ultracentrifugation, and other such physico-chemical or analytical methods.

One procedure that has been found to be a particularly useful analytical and diagnostic tool for the determination of antibodies or antigens is the technique known as "immunodiffusion." Immunodiffusion involves a reaction, e.g., between an antigen and an antibody, in semi-solid gel media, generally an agar gel. Both reactants are initially soluble in the medium, but the subsequent reaction product or complex of the antigen-antibody reaction is insoluble and results in the formation of a visible precipitin arc that can be observed visually with the eye or photographically. The agar gel diffusion method for the study of precipitation reactions has come to be known as the Ouchterlony technique in view of the early and intensive work in the field by Orjan Ouchterlony, "Handbook of Immunodiffusion and Immunoelectrophoresis," Ann Arbor Science Publishers, Inc., Ann Arbor, Mich. (1968).

A special adaptation of immunodiffusion, known as "immunoelectrophoresis," employs the combined technique of separation of mixtures of antigens by agar gel electrophoresis and subsequent antigen-antibody reactions resulting in the formation of Ouchterlony, or precipitin, arcs.

Another adaptation of immunodiffusion, known as "radial immunodiffusion," employs an agar gel system containing the antibody in the agar gel and the antigen in the test serum diffuses radially from a circular reservoir or well to form a radial precipitin zone in the agar gel.

The aforesaid general techniques of immunodiffusion are summarized by Lou and Shanbrom, *J. Am. Med. Ass'n.*, Vol. 200, pp. 161 and 323 (1966).

In the study of certain antigen-antibody reactions it has been found that completion of reaction requires the aid of a special agent, present in normal sera, known as complement. In these serological reactions two stages have been distinguished. The first stage is the specific union between antibodies and the substrate, which is then followed by a second stage involving visible changes such as flocculation or lysis. Thus it is known that after fixation of lysins to cells, addition of complement is necessary to bring about dissolution.

The characteristic of complement to be bound by the aggregates formed through the interaction of antigens and antibodies is the basis for a commonly used serological test referred to as the complement-fixation reaction. In this test, the antigen and antibody to be tested are mixed with a source of complement and, after incubation, hemolytic immune serum and corresponding red cells are added. If an immunological reaction takes place in the first stage, complement is fixed and removed from the solution and hemolysis is prevented, completely or in part, according to the intensity of the reaction.

Immunodiffusion techniques as described hereinbefore have recently been applied to studies on serological hemolysis and, particularly, to studies on the complement-fixation test. Thus, Milgrom et al., *Vox Sang.*, Vol. 8, pp. 537–48 (1963) and *J. Immunol.*, Vol. 96, pp. 415–23 (1966), have described agar gel diffusion procedures for studies on lysis of sheep red blood cells, induced by rabbit anti-sheep hemolysin and guinea pig complement. In single diffusion procedures, hemolytic zones were studied which were formed by complement diffusing into agar containing sheep red blood cells and hemolysin as well as hemolytic zones formed by hemolysin diffusing into agar containing sheep red blood cells and complement. In double diffusion procedures, complement and hemolysin were allowed to diffuse against each other in agar containing sheep erythrocytes only. These diffusion procedures were particularly applied to the study of $\gamma$ G and $\gamma$ M hemolytic antibodies.

It is an object of the present invention to provide a new and improved method for the determination of complement fixing antibodies in biological fluids.

It is another object of this invention to provide a single diffusion method for the quantitative or semi-quantitative determination of complement fixing antibodies in blood serum.

It is a further object of this invention to provide a rapid and convenient method for the detection and quantitation of complement fixing antibodies in a patient's serum as a useful adjunct in the diagnosis of diseases known to produce complement fixing antibodies, for example, various microbial, viral, bacterial, rickettsial, protozoan, fungal and helminthal infections.

Other objects and advantages will be apparent to the person skilled in the art after reading the disclosure hereof.

In accordance with the present invention, predetermined amounts of complement and a complement fixing antigen are admixed with an antibody-containing biological fluid in predetermined proportions and the mixture is reacted with a known amount of hemolysin-sensitized erythrocytes in a semi-solid solid gel medium for a predetermined period of time.

In this procedure if complement is not fixed (negative test), a clear, visible radial diffusion zone of lysis appears, whereas if complement and antigen are fixed to the antibody (positive test), no lysis occurs. In a positive test the diameter of the diffusion zone is inversely proportional to the complement fixing antibody titer.

In a preferred method of the invention, the hemolysin-sensitized erythrocytes are homogeneously dispersed in a semi-solid gel medium on a plate and the mixture of complement, complement fixing antigen, and antibody-containing biological fluid is introduced into the semi-solid gel medium through open wells or cylindrical holes punched or otherwise formed in the gel. In this procedure, the diffusion zone of lysis will form at the interface of the gel and the fluid sample introduced through the well.

Preferably, a mixture of complement fixing antigen and an excess of complement is added to the unknown sample of blood serum or other biological fluid to be determined for complement fixing antibodies and the resulting mixture is added to the open wells by means of a capillary pipette or similar device. The plate is then incubated at a temperature of from about 0° to about 50°C for about 30 minutes to about 48 hours, and preferably at about 30°–40°C for about 2–6 hours. During this incubation, a clear, radial diffusion zone of lysis will appear in a negative test.

The amounts and proportions of antigen, complement and unknown sample used in the method of this invention can vary widely so long as they are predetermined and can be compared with control or known samples. In an illustrative example, excellent results are obtained when one volume of antigen, one volume of complement which has been diluted 1:5 and one volume of unknown blood serum are incubated at about 0°–10°C for about 30 minutes to about 18 hours.

In the preparation of the gel medium, any conventional gelling agent can be used, for example, gelatin, pectin, silica gel, starch, polysaccharides from seaweeds such as agar, algin and carrageenin, synthetic polymeric gelling agents such as the cross-linked polyacrylamide disclosed in U.S. Pat. No. 3,046,201, the modified celluloses disclosed in U.S. Pat. No. 3,360,440 and the like materials. The gelling agent preferably has the physical properties characterizing agar-agar insofar as it is readily dispersible in water and capable of forming an essentially clear hydrogel of sufficient rigidity so that the receptacle or plate containing the gel can be inverted without danger of the gel falling out.

Agar is the preferred gelling agent employed in the gel medium of the present invention. This gelling agent is generally used at a concentration of from about 0.1 to about 5 percent by weight of gel medium, and preferably at a concentration of about 1.5 percent by weight of the gel medium.

The gel medium is conveniently prepared by dissolving the gelling agent in hot water, adding predetermined amounts of hemolysin-sensitized erythrocytes, mixing thoroughly, and pouring into a low-sided flat receptacle (herein also referred to as a plate) in an amount appropriate for the size of the plate. The hemolysin-sensitized erythrocytes are generally used at a concentration of from about 0.05 to about 5 percent by weight of the gel medium, and preferably at a concentration of about 0.5 percent by weight of the gel medium. Preferably, equal volumes of solutions of the gelling agent and the hemolysin-sensitized erythrocytes are used in preparing the gel medium. The mixture of the gelling agent and hemolysin-sensitized erythrocytes is then allowed to gel, and wells or cylindrical holes approximately 1 to 10 millimeters in diameter are punched or otherwise formed in the gel.

The method of this invention can be used for the determination of antibodies which will react with antigens in a complement-fixation reaction. Thus, it can be used to determine the antibodies to various bacterial, fungal, viral, parasitic and rickettsial antigens. An example of a suitable complement fixing antigen is the Kolmer antigen described by Kolmer et al., *J. Vener. Dis. Inform.*, Vol. 29, pp. 166–72 (1948). Other illustrative complement fixing antigens are the Rocky Mountain spotted fever, epidemic typhus, mumps virus, and coccidioidomycosis antigens.

The complement used in this invention can be obtained from any well-known source of complement. For example, a commercially available lyophilized whole guinea pig serum reconstituted to its original volume can be used. Preferably, the reconstituted serum is diluted 1:5 before use.

A suitable complement can also be conveniently prepared by collecting whole guinea pig blood and allowing it to clot. The red blood cells are removed by centrifugation and the retained serum is frozen and dried and then reconstituted before use.

Preferably, the dried complement is reconstituted with Kolmer saline solution, which can be prepared by dissolving 8.5 grams NaCl, 0.082 grams $MgCl_2.6H_2O$ and 0.040 grams $CaCl_2.2H_2O$ in one liter distilled water.

A small amount of preservative, for example, about 0.01 percent sodium azide, is preferably added to the complement prior to drying.

Human, rabbit and other species of animals can also be used as sources of complement for use in the present invention.

The hemolysin-sensitized erythrocytes used in this invention are preferably hemolysin-sensitized sheep red blood cells. The latter cells are suspended in Kolmer saline solution at a concentration of about 1 to 5 percent, and preferably at about 2 percent by volume, and then sensitized with sheep cell hemolysin.

The sheep red cells can be hemolysin-sensitized as follows: Sheep cell hemolysin is diluted with from about 10 to about 100, and preferably about 19, volumes of Kolmer saline solution. To one volume of this hemolysin dilution is added about one volume of sheep red blood cells, preferably in a 2 percent suspension as described above. The sheep cell hemolysin and sheep red blood cells are mixed at about 0° to 30°C, and preferably at about 25°C, for about 10 minutes, whereby the sheep red cells became sensitized to the hemolysin. Rabbit serum or serum of other animal species having antibodies to sheep red blood cells can be used as the sheep cell hemolysin in this procedure.

The gel plate containing hemolysin-sensitized erythrocytes can be overlaid with a protective membrane, packaged by various means, and thereby made conveniently available for subsequent use in the determination of complement fixing antibody activity by hospitals, laboratories and other agencies and persons having need for a simplified, yet accurate, determination of complement fixing activity in blood plasma samples. The packages for these plates can be, for example, plastic film or metal foil bags, pouches, and the like, preferably sterilized and sealed to prevent the admission of air, moisture, dirt and other contaminating materials. Suitable metal foil can be fabricated, for example, from aluminum and like metals; suitable plastic film can be fabricated, for example, from vinyl chloride and vinylidiene chloride copolymers, polyvinyl chloride, polyvinyl alcohol, polyethylene, polypropylene, polystyrene, polycarbonates, polyamides, cellulose acetate and propionate, cellulose triacetate, cellulose acetate butyrate, ethyl cellulose, fluorocarbons, acrylic plastics such as acrylates and methacrylates, and polyesters such as, for example, polyesters formed by condensation reactions between ethylene glycol and terephthalic acid.

The gel plates obtaining the hemolysin-sensitized erythrocytes can also be packaged in combination with complement fixing antigens, complement and control samples, as well as with capillary tubes and other components for making the complete complememt fixing assay.

The following examples will further illustrate the invention although the invention is not limited to these specific examples. All parts and percentages herein are on a weight basis unless otherwise specified.

EXAMPLE 1

Hemolysin-sensitized erythrocytes are suspended in a semisolid gel medium as follows:

Sheep cell hemolysin is diluted 1:20 with Kolmer saline solution and then mixed with an equal volume of sheep red cells. This mixture is then mixed with an equal part by volume of a heated aqueous solution of 3.0 percent Difco Noble Agar. The heated mixture is then poured into a plate of approximately 3 × 1 × ¼ inches deep and allowed to gel. Six wells, each having a diameter of 2 mm. and being equidistantly spaced apart, are then punched into the gel.

The above prepared test plate is then used for the determination of complement fixing antibodies to Kolmer antigen as follows:

One part by volume of Kolmer antigen is first mixed with an equal volume of complement and then with an equal volume of a blood serum sample in a test tube and held at 5°C for 1 hour. The complement is a reconstituted guinea pig complement diluted 1:5 with Kolmer saline solution. The mixture is then added to a well in the plate and incubated at 37°C for 4 hours. At the end of the incubation period, a clear, visible radial diffusion zone of lysis appears in a negative test in which the complement is not fixed, whereas no lysis or substantially less lysis appears in a positive test in which complement and the Kolmer antigen are fixed to the antibody in the blood serum sample.

In order to provide a quantitative or semiquantitative determination of the complement fixing antibodies, three different dilutions of an unknown blood serum sample are compared with three similar dilutions of a control or known sample. In this procedure, the ring diameters of the control samples can be compared to the ring diameters of the unknown samples and the complement fixing antibody titer thereby estimated. The zone of lysis is substantially inversely proportional to the degree of complement fixed by the reaction.

EXAMPLE 2

Example 1 is repeated except that Rocky Mountain spotted fever antigen is substituted for the Kolmer antigen in said example to determine the complement fixing antibody titer of a blood serum sample against the test antigen.

EXAMPLE 3

Example 1 is repeated except that epidemic typhus antigen is substituted for the Kolmer antigen in said example to determine the complement fixing antibody titer of a blood serum sample against the test antigen.

EXAMPLE 4

Example 1 is repeated except that mumps virus antigen is substituted for the Kolmer antigen in said example to determine the complement fixing antibody titer of a blood serum sample against the test antigen.

EXAMPLE 5

Example 1 is repeated except that coccidioidomycosis fungal antigen is substituted for the Kolmer antigen in said example to determine the complement fixing antibody titer of a blood serum sample against the test antigen.

Various other examples can be devised by the person skilled in the art after reading the foregoing specification and the appended claims without departing from the spirit and scope of the invention herein. Thus, other known complement fixing antigens can be substituted for the antigens in the above examples for the determination of the corresponding complement fixing antibodies. Other dilutions of antigen, complement, hemolysin-sensitized erythrocytes and gelling agent can be used in place of the specific dilutions described in the foregoing examples with substantially equivalent results. All such further examples are within the scope of this invention as defined in the appended claims.

What is claimed is:

1. A diagnostic method for the determination of the presence of antibodies to Kolmer antigen in blood serum comprising admixing (A) about one part by volume of guinea pig complement reconstituted in Kolmer saline with (B) about one part by volume of Kolmer antigen and (C) about one part by volume of blood serum and then (D) reacting the resulting mixture for a predetermined period of time with hemolysin-sensitized erythrocytes homogeneously dispersed in a semi-solid gel medium containing from about 0.1 to about 5 percent by weight agar on a plate by allowing said mixture to come into contact with said hemolysin-sensitized erythrocytes by radial diffusion from a well in the surface of said gel during incubation at about 37°C for a predetermined period of time, said hemolysin-sensitized erythrocytes comprising (E) about one part by volume sheep cell hemolysin in about 10 to 100 parts by volume Kolmer saline admixed with (F) about one part by volume sheep erythrocytes dispersed at a concentration of about 1 to 5 percent Kolmer saline, said Kolmer saline comprising aqueous NaCl, $MgCl_2 \cdot 6H_2O$ and $CaCl_2 \cdot 2H_2O$.

* * * * *